(No Model.)
B. THOMPSON.
DUPLEX TELEGRAPH.
No. 286,867. Patented Oct. 16, 1883.
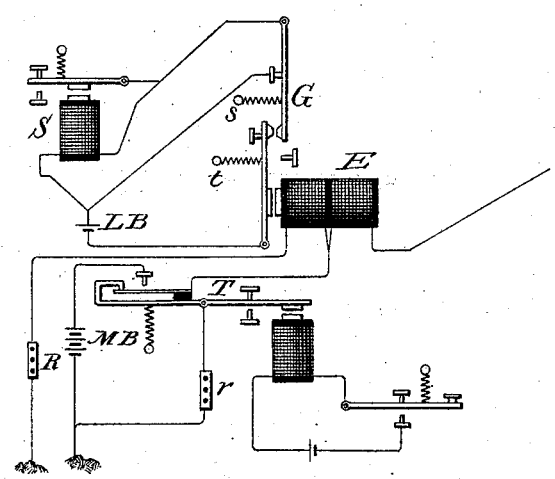
Witnesses.
E. Alshagen
Thos. Dooney
Inventor.
B. Thompson
by H. C. Townsend
Atty.

United States Patent Office.

BENJAMIN THOMPSON, OF BUFFALO, NEW YORK.

DUPLEX TELEGRAPH.

SPECIFICATION forming part of Letters Patent No. 286,867, dated October 16, 1883.

Application filed June 12, 1882. (No model.)

*To all whom it may concern:*

Be it known that I, BENJAMIN THOMPSON, a citizen of the United States, and a resident of Buffalo, in the county of Erie and State of New York, have invented certain new and useful Improvements in Duplex Telegraphs, of which the following is a specification.

The object of my invention is to prevent the disturbing effects upon the reading-sounder of a duplex or quadruplex telegraph, occasioned by false movements of the relay-lever of a differential receiver, due to the difference in static or charge capacity of the main and artificial lines, or to static discharge of the main line.

My invention consists in short-circuiting or diverting the local battery by which the reading-sounder is operated at the moment of static charge and discharge, or, in other words, at the moment when the armature-lever of the relay is drawn forward by the disturbing action attendant upon the charge and discharge of the main line.

I may carry out my invention either by causing the relay-armature itself to complete a branch or short circuit for the local battery whenever it is momentarily drawn forward by the static discharge or charge, the arrangement being such that when it is fully drawn forward by a signaling-current it shall break the short circuit and allow the battery to act through a circuit including the sounder, which circuit was closed at the same time with the closing of the short or derived circuit; or I may cause such short or derived circuit around the sounder to be closed by the movements of the transmitter-lever at the same station with the sounder, a suitable circuit-closing device being operated by the transmitter-lever in such a way as to momentarily complete the short or derived circuit for the local battery at the instant that the main battery is put to line or is withdrawn from line—that is, at the instant when the disturbing effects of static charge and discharge would otherwise be felt.

The figure is a diagram illustrating one arrangement of apparatus suitable for carrying out my invention.

In the figure I have illustrated the application of the invention to an ordinary duplex telegraph, the apparatus at one end of the line only being shown.

T represents an ordinary two-point continuity-preserving transmitter worked by a local electro-magnet battery and key, and M B the main battery, which is put to line by the transmitter when the key is closed, and is removed from line when the key is opened, a connection to earth through a resistance, $r$, approximately equal to that of the battery being then substituted for incoming signals.

E represents an ordinary differentially-wound relay, one of whose coils is in the line-circuit and the other in the artificial circuit containing the balancing-resistance R.

The reading-sounder is indicated at S, and the local battery for the same at L B, one pole of the latter being connected in the ordinary way to the relay armature-lever, and the other to one end of the sounder-coils. In the present instance, however, an additional connection is taken from that pole of the battery to which the sounder is connected, to the contact-stop of a supplemental lever, G, with which latter the armature-lever of the relay makes contact when drawn forward from its back stop. The supplemental lever is held against its contact-stop by the action of a spring, $s$, and the coils of the sounder on the opposite side from the battery are connected with said lever. The relay armature-lever is held against its back stop by the action of a spring, $t$, and is normally out of contact with the supplemental lever. The circuits may be easily traced, and need not be rehearsed in detail.

The operation is as follows: Under the action of incoming currents the relay operates in the ordinary way to close a circuit for the reading-sounder by making contact with the supplemental lever and removing the latter from its contact-stop, the signaling-currents being sufficiently prolonged and strong to fully overcome the action of both retracting-springs $s$ and $t$. When the armature-lever is thus drawn forward, the circuit of the battery is through the sounder, the supplemental lever, and the armature-lever, the short circuit through the contact-stop of the supplemental lever being broken. If the disturbing action attending the static charge and discharge be sufficient to momentarily draw the armature-lever forward into contact with the supplemental lever, the armature-lever will at this point meet with the opposition of the retractor *s* of the supplemental lever, and although it may make full contact with said lever, so as to close the sounder-circuit and the short circuit for the battery, it will not disconnect the supplemental lever from its stop, so as to fully break the short circuit, the action not being sufficiently prolonged or of sufficient strength to overcome the added tension of the spring *s*, which is specially adjusted to prevent such a result. Under such circumstances the only effect will be to close the short circuit for the battery. If in this condition of the apparatus a signal from the distant end of the line draw the lever forward still farther, overcoming the tension of both retractors, the short circuit will be broken and the sounder will respond by the action of the current flowing through the supplemental lever and the armature-lever, which come into contact when the short circuit is formed and remain in contact when said short circuit is broken.

I do not limit myself to any particular arrangement or construction of the circuit-closing devices whereby the local battery is short-circuited or cut out at the time that the relay is exposed to the disturbing action of the static charge and discharge, and many others may be employed in place of those shown, which are indicated merely for the purpose of illustration.

It is obvious that my invention may be applied to any duplex or multiplex telegraph.

What I claim as my invention is—

1. The combination, substantially as described, of a sounder, a relay, an armature therefor, and means for completing a short circuit around the sounder at the moment of flow of the static charge and discharge current in the relay-coils.

2. The combination, substantially as described, of a sounder, a relay, an armature-lever therefor, a supplemental lever, and means for completing a short circuit around the sounder when the armature strikes the supplemental lever under the influence of the static charge or discharge current, and breaking said short circuit when the armature-lever is acted upon by a signaling-current from the distant station.

3. The combination, with a sounder and its relay, of a supplemental contact-lever, and a stop for said lever connected to a short-circuiting wire for the sounder, as and for the purpose set forth.

4. The combination, substantially as described, upon a duplex or multiplex telegraph line, of a relay armature-lever connected to one pole of the local battery, a supplemental contact-lever, a contact-stop for the latter connected directly to the other pole of the battery, and a sounder placed in circuit between the local battery and the supplemental contact-lever.

5. The combination, substantially as described, upon a duplex or multiplex telegraph line, of a relay, a local battery and sounder, a supplemental contact-lever, a stop therefor arranged to form a portion of a short circuit for the battery, and a spring applied to the supplemental lever and adjusted so as to resist the action of the relay under the effects of static charge and discharge, but to be overcome by signals from the distant station, thus allowing the short circuit to be broken.

Signed at New York, in the county of New York and State of New York, this 7th day of June, A. D. 1882.

BENJAMIN THOMPSON.

Witnesses:
 H. C. TOWNSEND,
 THOS. TOOMEY.